United States Patent [19]

Coenen et al.

[11] Patent Number: 4,953,411
[45] Date of Patent: Sep. 4, 1990

[54] ANGULAR BEVEL GEAR DRIVE FOR AGRICULTURAL IMPLEMENTS

[75] Inventors: Karl Coenen, Siegburg; Michael Flanhardt, Cologne; Hans-Jürgen Langen, Frechen, all of Fed. Rep. of Germany

[73] Assignee: Jean Walterscheid GmbH, Siegburg, Fed. Rep. of Germany

[21] Appl. No.: 348,818

[22] Filed: May 8, 1989

[30] Foreign Application Priority Data

May 18, 1988 [DE] Fed. Rep. of Germany ....... 3816828

[51] Int. Cl.$^5$ .......................... G01L 3/10; G01L 3/12
[52] U.S. Cl. ............................ 73/862.33; 73/862.34; 74/417
[58] Field of Search ........... 73/862.31, 862.32, 862.33, 73/862.34, 862.35, 862.21, 862.23; 74/417

[56] References Cited

U.S. PATENT DOCUMENTS

| | | |
|---|---|---|
| 2,947,168 | 8/1960 | Yang . |
| 3,604,255 | 9/1971 | Bart . |
| 3,938,890 | 2/1976 | Flavell . |
| 4,084,429 | 4/1978 | Boland .............. 73/862.35 |
| 4,085,612 | 4/1978 | Rundell . |
| 4,182,168 | 1/1980 | Desch . |
| 4,597,296 | 7/1986 | Crane et al. . |
| 4,838,108 | 6/1989 | Flanhardt et al. ............. 74/417 |

FOREIGN PATENT DOCUMENTS 3112714 11/1982 Fed. Rep. of Germany .

OTHER PUBLICATIONS

R. H. Peterson, "Torquemeter", IBM Tech. Disclosure Bltn., vol., No. 5, Feb. 1959, 33–34.

Primary Examiner—Charles A. Ruehl
Attorney, Agent, or Firm—Toren, McGeady & Associates

[57] ABSTRACT

The invention relates to an angular bevel gear drive (6), for driving, or for the drive of, agricultural implements. It comprises a basic housing (9) and bevel gears (13, 14) arranged therein. The shafts (10, 11) of one or several of the bevel gears (14) are associated with individual bearing units (15) into which a torque measuring device (12) is integrated, i.e. the torque may be measured both at the input and the output end. The torque measuring device (12) operates in a contact-free way and is arranged between the bearings (18, 19) of the bearing unit (15). By combining the drive with a torque measuring instrument (12) it is possible to make optimum use of the power of the tractor and the implement or individual functional areas of the implement.

7 Claims, 6 Drawing Sheets

ANGULAR BEVEL GEAR DRIVE FOR AGRICULTURAL IMPLEMENTS

BACKGROUND OF THE INVENTION

Field of the Invention

The invention relates to an angular bevel gear drive for the drive of, or the drives in, agricultural implements, having an input shaft and at least one output shaft, with the input shaft and/or at least one output shaft being associated with a torque measuring device.

There are prior art angular bevel gear drives for driving, or for the drive of, agricultural implements for distributing or diverting the torque.

In the case of agricultural implements driven by the tractor, the power of the tractor should, on the one hand, be used in an as optimum way as possible and, on the other hand, overloading of the implement or individual functional areas of the implement as well as of the tractor is to be avoided in order to prevent any damage from occurring.

So far, when the torque was exceeded, slipping couplings or disconnecting couplings were used to provide protection against overloading. It requires a great deal of skill and experience on the part of the tractor driver to operate the unit in such a way that the tractor power is used up to its limit without causing any reaction on the part of the couplings.

A reaction on the part of the coupling means that the vehicle may have to be stopped in order to eliminate any interference and to effect re-connection.

It is therefore the object of the invention to provide a device which is integrated into the driveline for driving an agricultural implement and/or individual functional areas of the implement, which permits optimum use of the performance of the tractor/implement combination without the need for interruption to eliminate any interference and which is simple and robust to be able to withstand the loads occurring in agricultural applications, and especially dirty conditions.

SUMMARY OF THE INVENTION

The invention provides an angular bevel gear drive for the drive of, or the drives in, agricultural implements, having an input shaft and at least one output shaft, with the input shaft and/or at least one output shaft being associated with a torque measuring device, wherein the drive comprises a housing, and at least one individual bearing unit for a bevel gear detachably mounted on the housing in which unit a torque measuring device is integrated, the torque measuring device being a measuring device operating in a contact-free way and being arranged between two bearings for supporting a shaft in the bearing unit.

If the torque measuring device is associated with the input shaft the entire torque applied can be determined. If the torque measuring device co-operates with a speed measuring device it is additionally possible to calculate the entire power available.

If the torque measuring device is associated with an output shaft, the unit to be driven and connected to a driveline branch may be monitored in respect of torque requirements or the power required in that area. By making a comparison with a pre-determined limit value it is possible for the driver to device whether the tractor, in view of the power required, may be driven even faster or whether the driving power has to be reduced. This arrangement also makes it possible to determine whether in individual areas there is a risk of a blockage. Furthermore, there are provided units which may optionally be associated with the basic housing.

Different torque measuring devices may be utilised. As a first alternative there is proposed a device which comprises slotted discs which are associated with the input and/or output shaft so as to adjoin each other but non-rotatingly attached to the respective shaft so as to be axially spaced and which comprise apertures dividing the housing in which they are received into two spaces, as well as of a light source associated with one space for producing a diffused light and a light measuring device associated with the other space, especially a photocell or photodiode, for measuring the amount of light passing from the one space into the other space.

The voltage measured at the photocell due to the light passing through is proportional to the torque applied. Because, in the torque-free condition, the slotted discs are arranged in such a way that the apertures in the two slotted discs overlap by a certain amount, the application of torque causes a change in the opening cross-section permitting the passage of light from the space containing the light source into the space in which the photocell is arranged. The opening cross section increases with an increasing torque. If torque is applied in the other direction, the cross section decreases in size. This means that the direction of torque application can also be identified. An essential advantage of this design is that torque can also be measured on a stationary shaft. And there is a further advantage of this design in that there is no need for rotary passages, slip-ring pick-ups or similar means for transmitting the measured values from a rotating to a stationary part.

This can also be achieved by associating the input shaft and/or output shaft with two toothed discs which are arranged so as to be spaced and which co-operate with two proximity sensors provided at the housing. The toothed discs comprise tooth shapes for generating cyclic curves of measured values, with the phase displacement of the curves of measured values being a measure for the torque applied.

Finally, it is possible to associate the input shaft and/or output shaft with two spaced discs comprising annular magnetic recording carriers which, in a coded form, contain a periodically recurring signal, and sensors associated with the housing record the signals in the time sequence, the phase displacement being a measure for the torque applied.

Preferably, the region of the bearing housing which receives the torque measuring device is sealed laterally towards the bearings. Sealing is provided both in respect of the drive housing and the lubricant contained in the bearings, but also in respect of any external light.

The torque measuring device may comprise a separate implement housing which may be slid into the basic housing or the bearing housing.

Finally, it is possible for the torque measuring device to be followed by an evaluating unit for releasing a signal for warning purposes, switching off the drive or actuating a coupling for interrupting the power flow. Such an evaluating unit is especially provided in those cases where a simple indication of the applied torque relative to the torque limits given on a scale of the voltage meter is not sufficient.

BRIEF DESCRIPTION OF THE DRAWINGS

An implement combination in which the drive in accordance with the invention is used, as well as the design of the drive in accordance with the invention, are diagrammatically illustrated in the drawings.

In the drawings.

DESCRIPTION OF PREFERRED EMBODIMENTS

Figure 1:
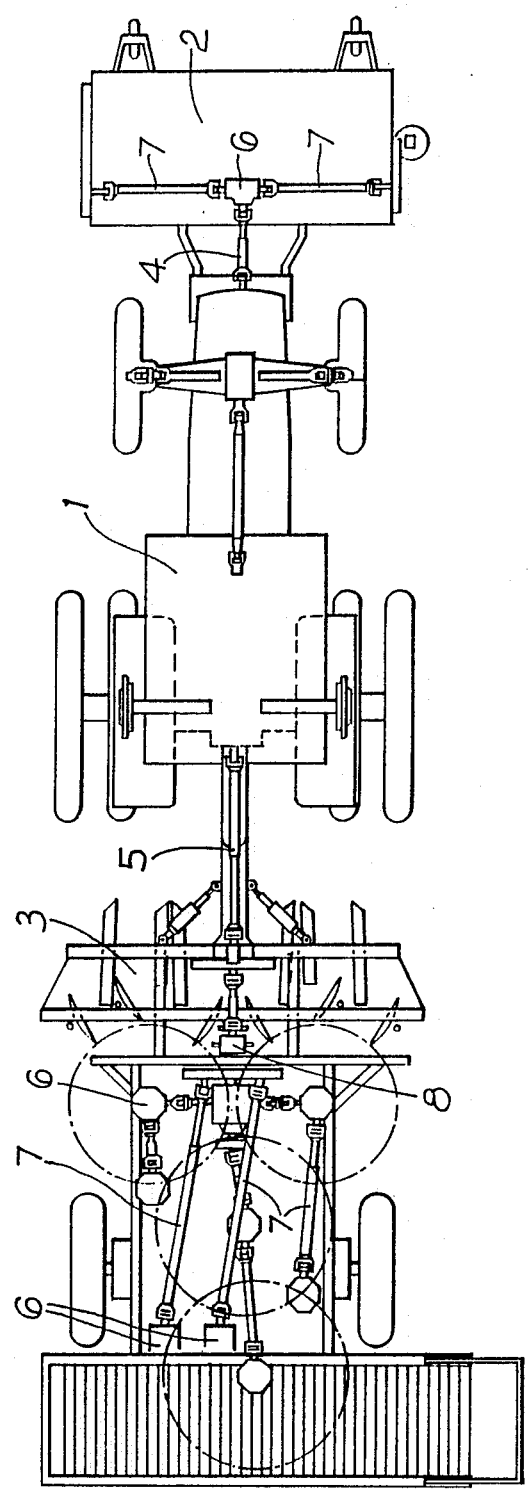
FIG. 1 is a plan view of a tractor implement.

FIG. 1 shows a tractor and implement combination consisting of the tractor 1, the implement 3 in the form of a beet harvester attached at the rear of the tractor and the implement 2 attached at the front. The operating tools of the implement 3 receive their rotary motion required for driving purposes from the tractor 1 by means of a main driveshaft 5 driven by the tractor 1 and the tools of the implement 2 receive their motion from a main driveshaft 4 driven by the tractor. Different subsidiary drives may be driven via subsidiary driveshafts 7 by the main driveshafts 4, 5 with drives 6 connected therebetween. The drives 6 are designed as angular drives, in particular as angular bevel gear drives, and are illustrated in more detail in FIGS. 2–6.

To protect individual drivelines or subsidiary drives it is possible to provide couplings 8 designed as switching couplings and whose switching is controlled by a torque measuring device 12 associated with the drive 6.

Figure 2:
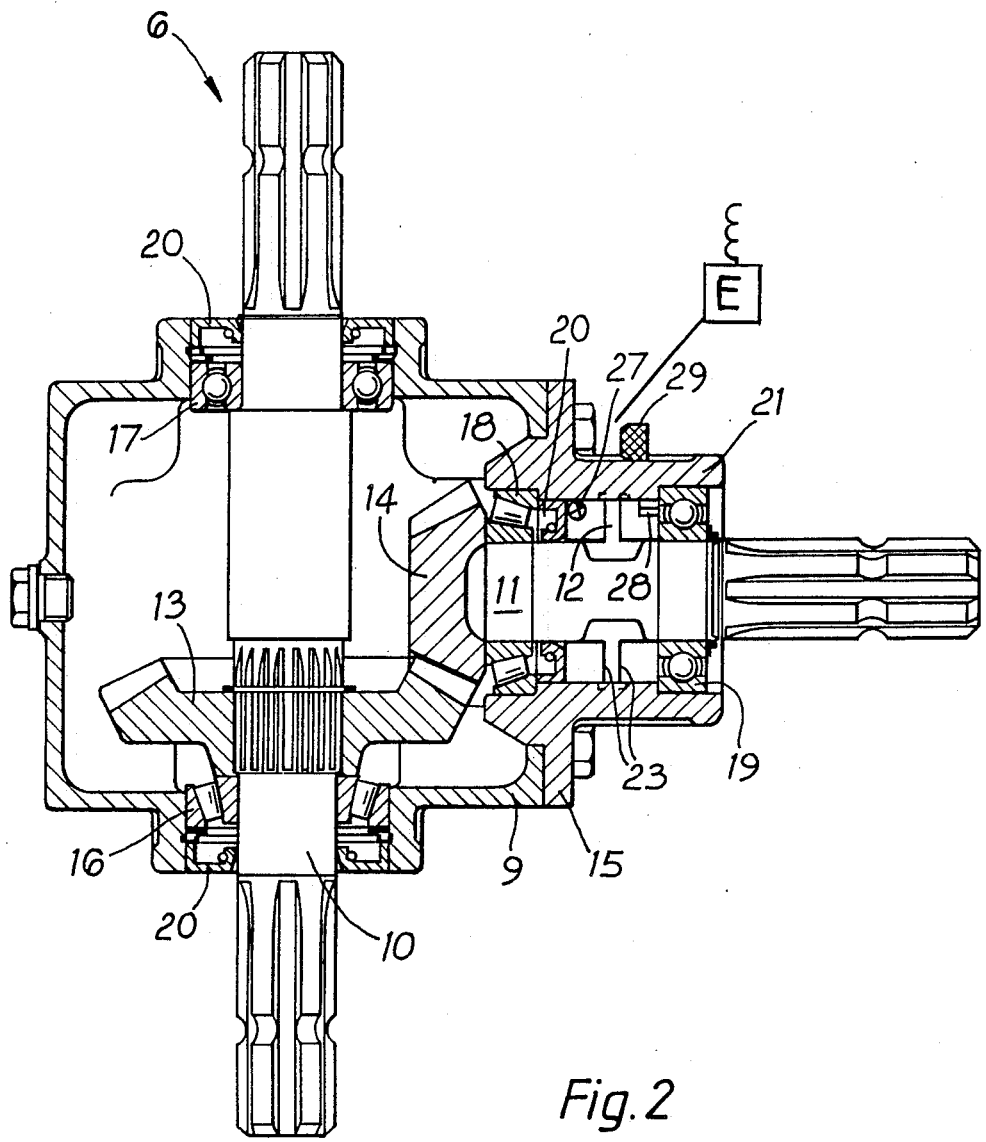
FIG. 2 is a section through a drive with a torque measuring device.

Each drive 6 is an angular bevel gear drive for the drive of, or the drives in, agricultural implements, having an input shaft and at least one output shaft, with the input shaft and/or at least one output shaft being associated with a torque measuring device 12. The drive 6 which is shown in FIG. 2 has bevel gears 13 and 14. The drive 6 comprises a housing 9 in which a first shaft 10 is rotatably received in bearings 16, 17. One of these bearings, i.e. the bearing 16, is designed to accommodate axial forces. Towards the outside, seals 20 have been provided between the shaft 10 and the bore of the basic housing 9 through which the shaft 10 passes.

The shaft 10 comprises stubs projecting at both ends from the basic housing 9 and provided with splines to permit connection to driveshafts or the like. The shaft 10 also comprises teeth on which the bevel gear 13 is non-rotatingly received. The drive 6 also comprises at least one, in this case only one, individual bearing unit 15, for the bevel gear 14, in which the torque measuring device 12 is integrated. The bevel gear 13 engages the further bevel gear 14 which is supported in the bearing unit 15. The bearing unit 15 is detachably mounted on the housing 9 being connected thereto by means of a flange. Starting from the bevel gear 14, a shaft 11 extends through the unit 15 so as to be supported on a first bearing 18 designed to accommodate axial forces and on a second bearing 19 arranged at a distance from the first bearing. The flanged bearing unit 15 also comprises the torque measuring device 12 arranged in the bearing housing 21 of the unit 15. The torque measuring device 12 is arranged between the two bearings 18, 19 in the bearing housing 21. In this region, the shaft 11 is reduced in diameter. Its rotation is measured and serves to determine, or is a measure for, the torque applied. One of the shaft 10, 11 may be designed as a driveshaft, i.e. as the input shaft and the other one as the output shaft. The torque may alternatively be measured both at the input end and at the output end. The space in the bearing housing 21 serving to accommodate the torque measuring device 12 is sealed by a further seal 20 towards the two bearings 18, 19. The bearing 19 is also sealed.

The torque measuring device 12 operates in a contact-free way and is designed as an optical measuring device. It comprises a light source 27, a photocell 28 and two slotted discs 23 with apertures 25 dividing the receiving space into two individual spaces A. B. On the one hand, the torque measuring device is connected to a power supply 32 via a connection 29 to supply the light source 27 with power and on the other hand, for the purpose of converting the light received by the photocell 28 into a torque value, it is connected to a voltage meter 31 provided with a scale for torque indicating purposes.

The basic design features of the torque measuring device 12 are given in FIG. 1.

Figure 5:
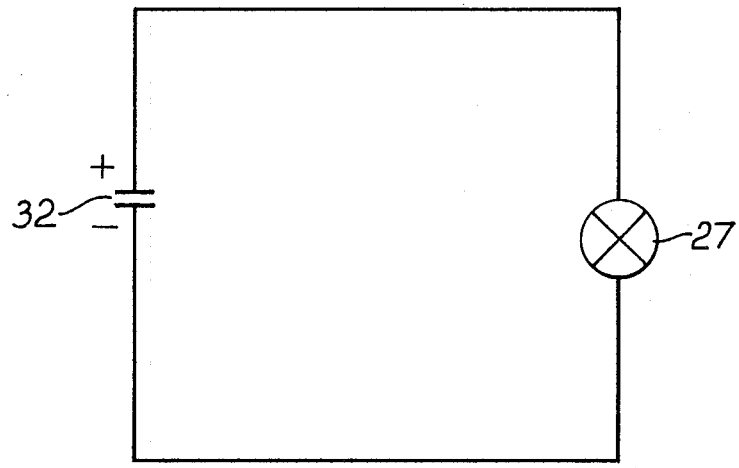
FIG. 5 shows the circuit diagram for the light source of the instrument of FIG. 3.
Figure 6:
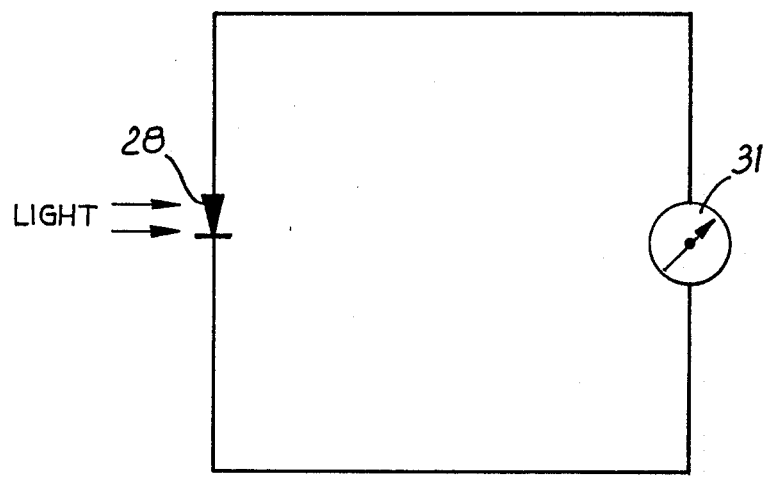
FIG. 6 shows the circuit diagram for the light measuring device of the instrument of FIG. 3.

In the bearing housing 21, i.e. between the two bearings 18, 19 there have been provided two slotted discs 23 on the shaft 11. The two slotted discs 23 immediately adjoin each other and, as can be seen from FIG. 4, comprise circumferentially distributed apertures 25. The two slotted discs 23 are arranged relative to each other in such a way that as long as no torque is applied to the shaft 11, the apertures 25 overlap to a certain extent. Starting from their radially inner ends, the two slotted discs 23 each comprise a sleeve extension 24 which extends towards the bearings 18, 19, and are provided with bores; they are firmly attached at these bores on the shaft 11. The fixing points of the slotted discs 23 on the shaft 11 are spaced so that if a torque is applied to the shaft 11 a sufficient amount of shaft length is available between the fixing points of the discs 23 for measuring the rotations under torque. The slotted discs 23 divide the interior of the bearing housing 21 into two spaces A and B. Additionally, there have been provided two flanges 26 which extend radially outwardly from the sleeves 24 and which complete the spaces A and B. In the region of the space A, in the housing wall of the bearing housing 21, there has been provided an indentation receiving the light source 27 in the form of a bulb. As can be seen in FIG. 5, the bulb 278 is connectable via a connection 27 to a power supply 32 with a switch (not shown) provided in between. In the housing wall of the bearing housing 21, in the region on space B, there has been provided a further indentation accommodating a light measuring device, i.e. the photocell 28. The photocell 28 is connected to the voltage meter 31 via the connection 29 (FIG. 6). The voltage meter 31 comprises a scale corresponding to the torque applied. If a torque is applied to the shaft 11, the two slotted discs 23 and thus their apertures 25 rotate relative to each other so that the opening cross section formed by the region of overlap of the apertures 25 of the two slotted discs between the spaces A and B is adjusted or changed in accordance with the torque applied and its effective direction.

The walls of the slotted discs 23, the sleeves 24, and flanges 26 bounding the spaces A and B and the inner wall of the bearing housing 21 are designed in such a way that a diffused light is generated and received. For this purpose, a white coat of paint or a white coating is provided. The amount of light passing through the opening cross section between the two spaces A and B into the space B is a measure for the torque applied. The photocell 28 converts this amount of light into a voltage value. The voltage measured is inversely proportional to the torque applied to the shaft 11.

The voltage meter 31 has a scale to indicate torque values and connected to the photocell 28 serves to indicate the torque applied and the torque direction and provides the tractor drive with information regarding the given limit value and whether the power limits of the tractor or implement or individual functional areas attached at the rear and/or front are utilised in an optimum way or whether their power limits are exceeded.

Figure 3:
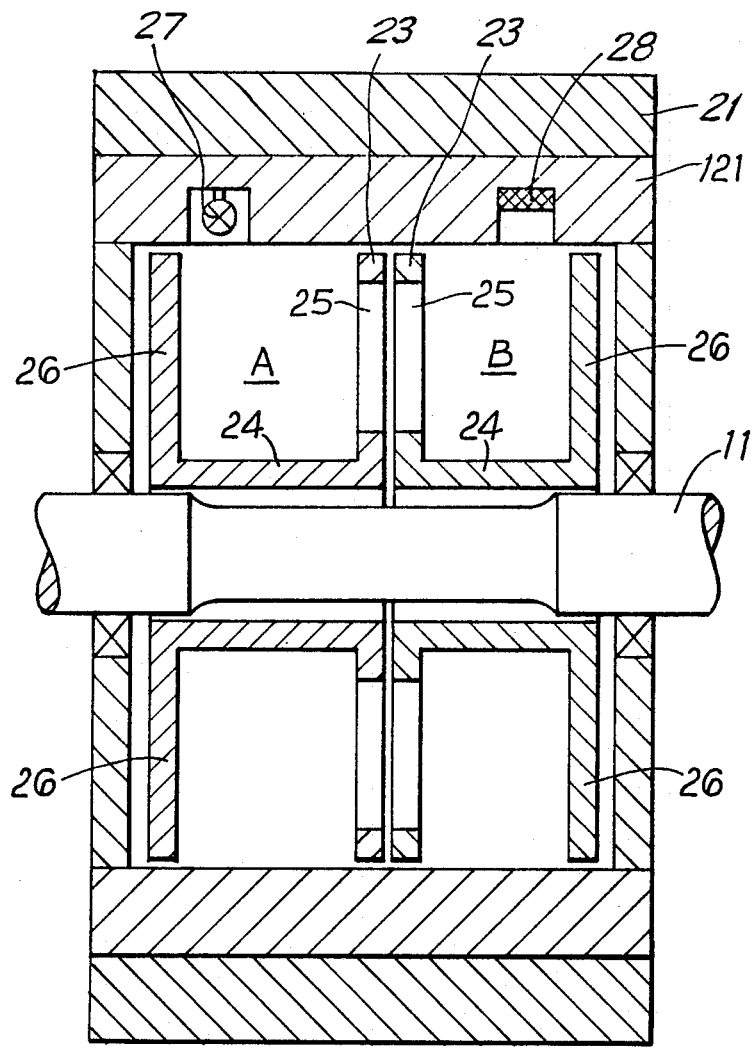
FIG. 3 shows the basic design of the torque measuring instrument.
Figure 4:
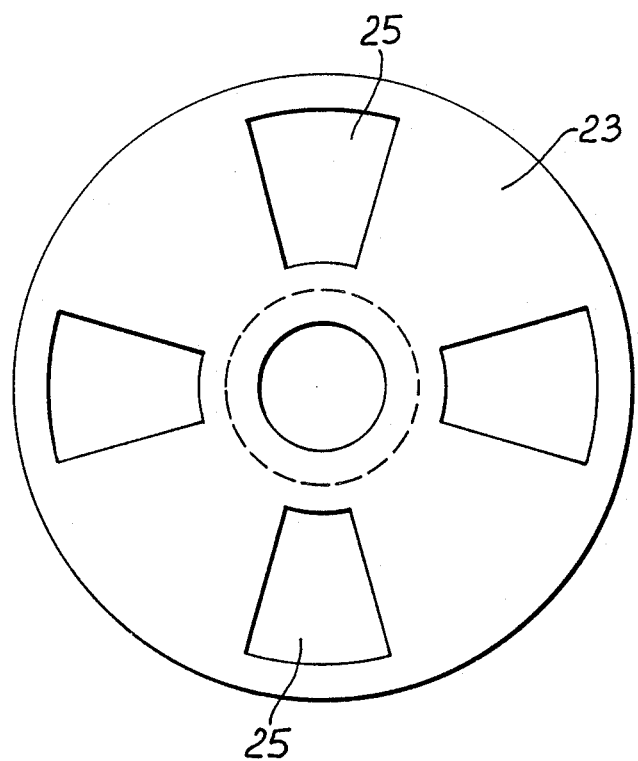
FIG. 4 illustrates a view of a slotted disc of the instrument of FIG. 3.

The torque measuring device 12 shown in FIG. 3 may also comprise a separate housing 121 which may be slid into the bearing housing 21.

It is also possible for the voltage meter 31 to be followed by an evaluating unit which, for example, serves to generate a switching signal for switching the coupling 8, as can be seen in FIG. 1, in order to stop for instance individual functional areas of the implement or even the main drive.

Figure 7:
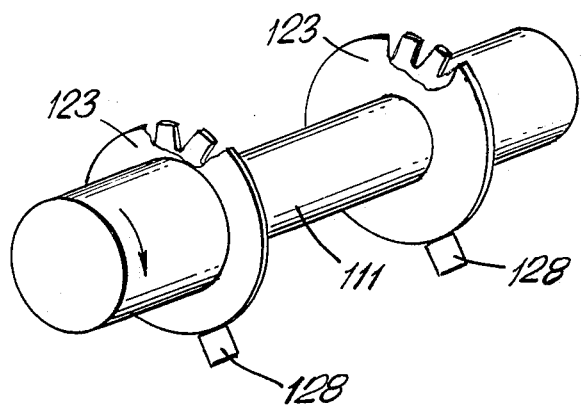
FIG. 7 shows an alternative embodiment of the torque measuring device.

FIG. 7 illustrates a measuring device having two sensors 128 associated with the input shaft 111 and designed as proximity sensors, as well as two sensed elements provided as toothed discs 123. The discs 123 having tooth shapes which generate cyclic curves of measured values, and whose phase displacement is a measure of the applied torque.

Figure 8:
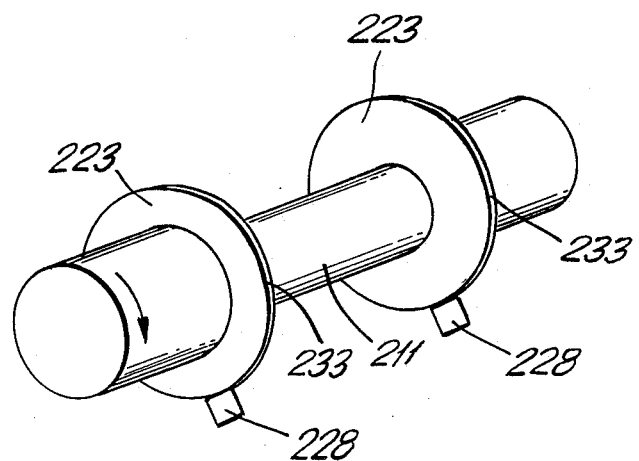
FIG. 8 shows still another embodiment of the measuring device.

FIG. 8 shows the measuring device having two discs 223 associated with the input shaft 211 and having annular magnetic recording carriers 233 which contain a periodically recurring signal. Two sensors 228 are provided for recording the signals on the time sequence. The phase displacement is also a measure of the torque applied.

We claim:

1. An angular bevel gear drive for the drive of, or the drives in, agricultural implements, having an input shaft and at least one output shaft, with the input shaft and/or at least one output shaft being associated with a torque measuring device, wherein the drive comprises a housing, and at least one individual bearing unit for a bevel gear detachably mounted on the housing in which unit a torque measuring device is integrated, the torque measuring device being a measuring device operating in a contact-free way and being arranged between two bearings for supporting a shaft in the bearing unit.

2. A drive according to claim 1, wherein the torque measuring device comprises slotted discs which are associated with the input and/or output shaft so as to adjoin each other but non-rotatingly attached to the shaft so as to be axially spaced and which comprise apertures dividing the housing in which they are received into two spaces as well as of a light source associated with one space for producing a diffused light and a light measuring device associated with the other space, especially a photocell or photodiode, for measuring the amount of light passing from the one space into the other space.

3. A device according to claim 1, wherein the torque measuring device consists of two sensors associated with the input shaft and/or output shaft and designed as proximity sensors as well as two sensed elements designed as toothed discs and comprising tooth shapes which generate cyclic curves of measured values and whose phase displacement is a measure for the torque applied.

4. A device according to claim 1, wherein the torque measuring device comprises two discs associated with the input and/or output shaft and comprising annular magnetic recordings carriers which, in a coded form, contain a periodically recurring signal, and two sensors associated with the housing, for recording the signals in the time sequence, the phase displacement being a measure for the torque applied.

5. A device according to claim 1, wherein the region of the bearing housing which receives the torque measuring device is sealed laterally towards the bearings.

6. A device according to claim 1, wherein the torque measuring device comprises a separate implement housing which may be slid into the bearing housing.

7. A drive according to claim 1, wherein the torque measuring device is followed by an evaluating unit for releasing a signal for warning purposes, switching off the drive or actuating a coupling for interrupting the power flow.

* * * * *